(12) United States Patent
Chang

(10) Patent No.: US 6,360,977 B1
(45) Date of Patent: Mar. 26, 2002

(54) CHANGE-SPEED CONSTRUCTION FOR A FISHING REEL

(76) Inventor: Liang-Jen Chang, No. 23, Lane 184-15, Hsin-Ping Rd., Tai-Ping City, Taichung Hsien (TW)

( * ) Notice: Subject to any disclaimer, the term of this patent is extended or adjusted under 35 U.S.C. 154(b) by 0 days.

(21) Appl. No.: 09/580,372

(22) Filed: May 26, 2000

(51) Int. Cl.⁷ .............................................. A01K 89/015

(52) U.S. Cl. .......................... 242/255; 242/318; 74/372

(58) Field of Search ................................ 242/255, 318, 242/394; 254/342; 74/371, 372

(56) References Cited

U.S. PATENT DOCUMENTS

| | | | | |
|---|---|---|---|---|
| 1,163,169 A | * | 12/1915 | Pavelka | 254/342 |
| 1,895,304 A | * | 1/1933 | Ancona | 242/255 |
| 2,252,777 A | * | 8/1941 | Marr | 242/255 |
| 3,250,489 A | * | 5/1966 | Hiromitsu | 242/255 |
| 4,566,674 A | * | 1/1986 | Ebey et al. | 254/342 |
| 4,951,898 A | * | 8/1990 | Sakaguchi | 242/255 |
| 5,058,447 A | | 10/1991 | Ikuta | |
| 5,690,287 A | * | 11/1997 | Ono | 242/255 |

FOREIGN PATENT DOCUMENTS

GB  0008957  * of 1898  .................. 242/255

* cited by examiner

Primary Examiner—Katherine A. Matecki
(74) Attorney, Agent, or Firm—Christensen O'Connor Johnson Kindness PLLC

(57) ABSTRACT

A change-speed construction is adapted for use in a fishing reel, and includes a rotary arm pivotally mounted on a side plate of a reel body at an inner end thereof, a handle unit fixed on an outer end of the rotary arm, and a control shaft mounted on the inner end of the rotary arm. The control shaft is biased to an extended position relative to the reel body. A hollow housing is fixed on the inner end of the rotary arm, and permits extension of the control shaft therethrough. The control shaft is axially movable from the extended position to a retracted position. A spring member is disposed in the housing. A retaining member includes an elongated retaining plate that has an inner end pivotally connected to a pivot member disposed in the housing, and a push knob connected fixedly to an outer end of the retaining plate in such a manner that the knob is exposed outwardly from the housing. The retaining plate is biased by the spring member to engage an annular groove in the control shaft when the control shaft is at the retracted position. The knob can be pushed way from the handle unit so as to result in rotation of the retaining plate around the pivot member.

5 Claims, 9 Drawing Sheets

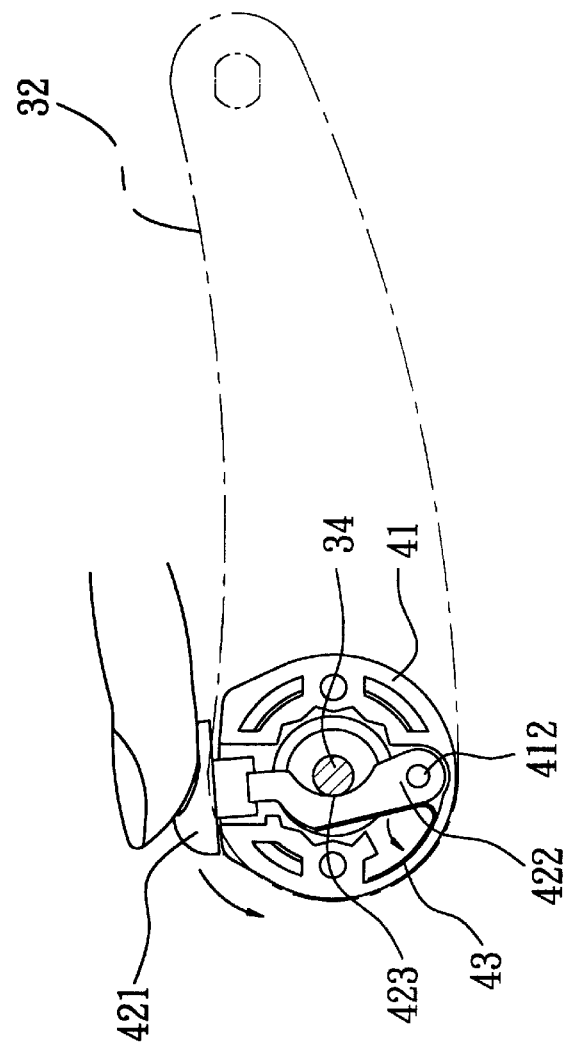
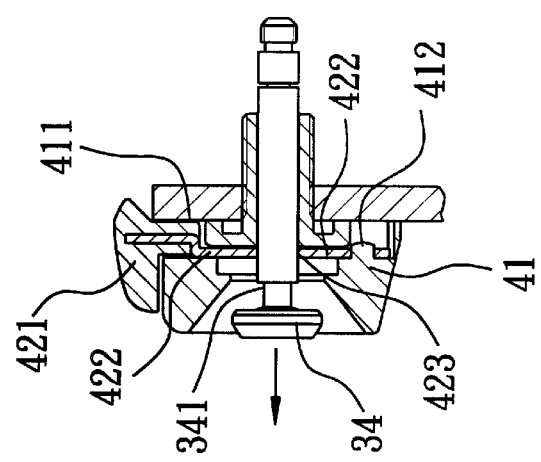
FIG. 7B
FIG. 7A

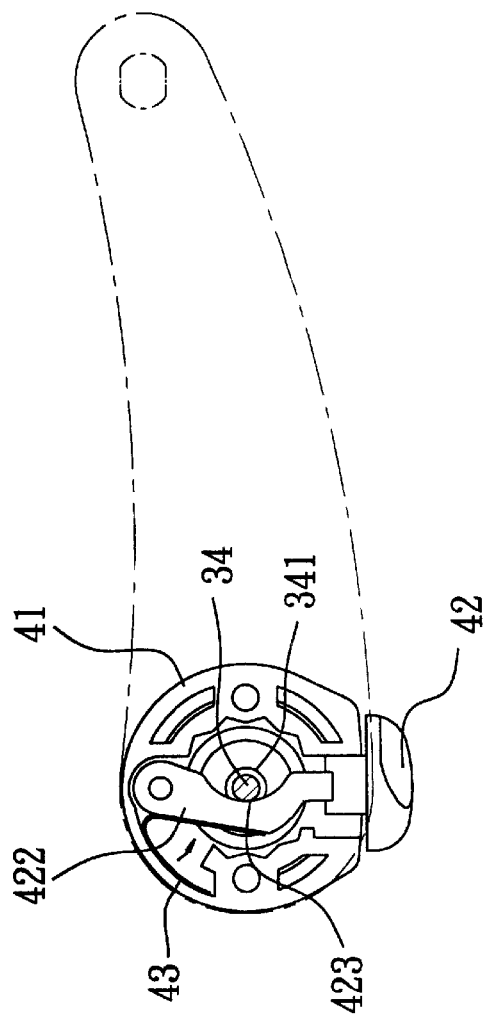
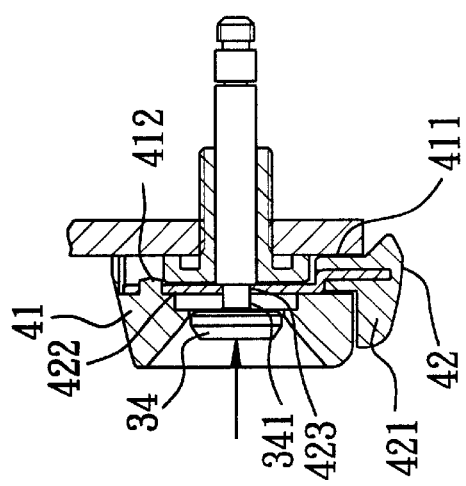
FIG. 9B
FIG. 9A

CHANGE-SPEED CONSTRUCTION FOR A FISHING REEL

BACKGROUND OF THE INVENTION

1. Field of the Invention

The present invention relates to a change-speed construction, more particularly to a change-speed construction for a fishing reel that is provided with an easy-to-operate change-speed knob.

2. Description of the Related Art

Referring to FIG. 1, a conventional change-speed construction for a fishing reel is shown to include a reel body 10, a rotary arm 12, a T-shaped handle unit 13, a hollow housing 21, a spring-biased control shaft 14, a spring member 221, and a retaining member 20.

As illustrated, the rotary arm 12 has an inner end mounted rotatably on a side plate 11 of the reel body 10. The handle unit 13 is disposed on an outer end of the rotary arm 12. The housing 21 is fixed on the inner end of the rotary arm 12. The control shaft 14 is mounted on the inner end of the rotary arm 12 and extends axially and movably on the reel body 10 in a manner, as disclosed in U.S. Pat. No. 5,058,447. The control shaft 14 is biased to an extended position, where the reel is adapted to rotate at a first speed. The control shaft 14 is capable of being pushed axially and inwardly to a retracted position relative to the reel body 10, where the reel is adapted to rotate at a second speed. The control shaft 14 extends through the housing 21, and has an annular groove 141 formed therein. The spring member 221 is disposed within the housing 21, and includes an elongated retaining plate 22 that has an inner end 222 disposed operably in the housing 21, and a push knob 224 mounted fixedly on an outer end of the retaining plate 22 in such a manner that the push knob 224 is exposed outwardly from the housing 21. The retaining plate 22 further has a shaft engaging hole 223, through which the control shaft 14 extends. When the control shaft 14 is pushed inwardly and axially in a direction denoted by arrowhead R1 in FIGS. 3A and 3B, the retaining plate 22 is biased in a direction denoted by arrowhead R2 to engage the annular groove 141 in the control shaft 14, thereby retaining the control shaft 14 at the retracted position.

Referring to FIGS. 2A and 2B, upon actuation of the push knob 224 in a direction denoted by arrowhead R4, the retaining plate 22 disengages the annular groove 141 in the control shaft 14 against biasing action of the spring member 221 to permit movement of the control shaft 14 in a directed denoted by arrowhead R3 so as to restore the control shaft 14 to the extended position.

Note that in order to permit movement of the control shaft 14 from the retracted position of FIGS. 3A and 3B to the extended position shown in FIGS. 2A and 2B, the push knob 224 must be depressed in the direction denoted by the arrowhead R4 in FIGS. 2A and 2B against biasing action of the spring member 221. It is relatively difficult for the user to depress the push knob 224 while the user is holding the handle unit 13 for winding and unwinding of the reel.

SUMMARY OF THE INVENTION

Therefore, the object of this invention is to provide a change-speed construction for a fishing reel that includes an easy-to-operate change-speed knob that can be operated while winding and unwinding the reel.

Accordingly, a change-speed construction for a fishing reel comprises a reel body, a rotary arm, a T-shaped handle unit, a tubular hollow housing, a spring-biased control shaft, a pivot member, a retaining member, and a spring member. The rotary arm has an inner end mounted rotatably on the reel body, and an outer end. The T-shaped handle unit is disposed on the outer end of the rotary arm, and the tubular hollow housing is fixed on the inner end of the rotary arm. The spring-biased control shaft is mounted axially and movably on the reel body and biased to an extended position, and is capable of being pushed axially and inwardly to a retracted position. The control shaft extends through the housing, and has annular groove formed therein. The pivot member is disposed in the housing and parallel to the control shaft. The retaining member includes an elongated retaining plate having an inner end rotatably connected to the pivot member, and an outer end, and a push knob connected fixedly to the outer end of the retaining plate and exposed outwardly from the housing. The retaining member is disposed relative to the control shaft so that the retaining plate engages the annular groove in the control shaft upon rotation of the retaining member. Finally, the spring member is provided to bias the retaining member so that the retaining plate engages the annular groove in the control shaft when the control shaft is disposed at the retracted position so as to retain the control shaft at the retracted position. The push knob of the retaining member is capable of being pushed in the direction, when the control shaft is disposed at the retracted position, against biasing action of the spring member so as to disengage the retaining plate from the annular groove such that the control shaft is biased to move from the retracted position to the extended position.

BRIEF DESCRIPTION OF THE DRAWINGS

Other features and advantages of this invention will become more apparent in the following detailed description of the preferred embodiments of this invention, with reference to the accompanying drawings, in which:

FIGS. 7A and 7B respectively show sectional and side views of the first preferred embodiment, illustrating how a push knob is operated in order to restore the control shaft to an extended position;

FIG. 9A and 9B respectively show sectional and side views of the second preferred embodiment, illustrating the control shaft in the retracted position.

DETAILED DESCRIPTION OF THE PREFERRED EMBODIMENTS

Figure 1:
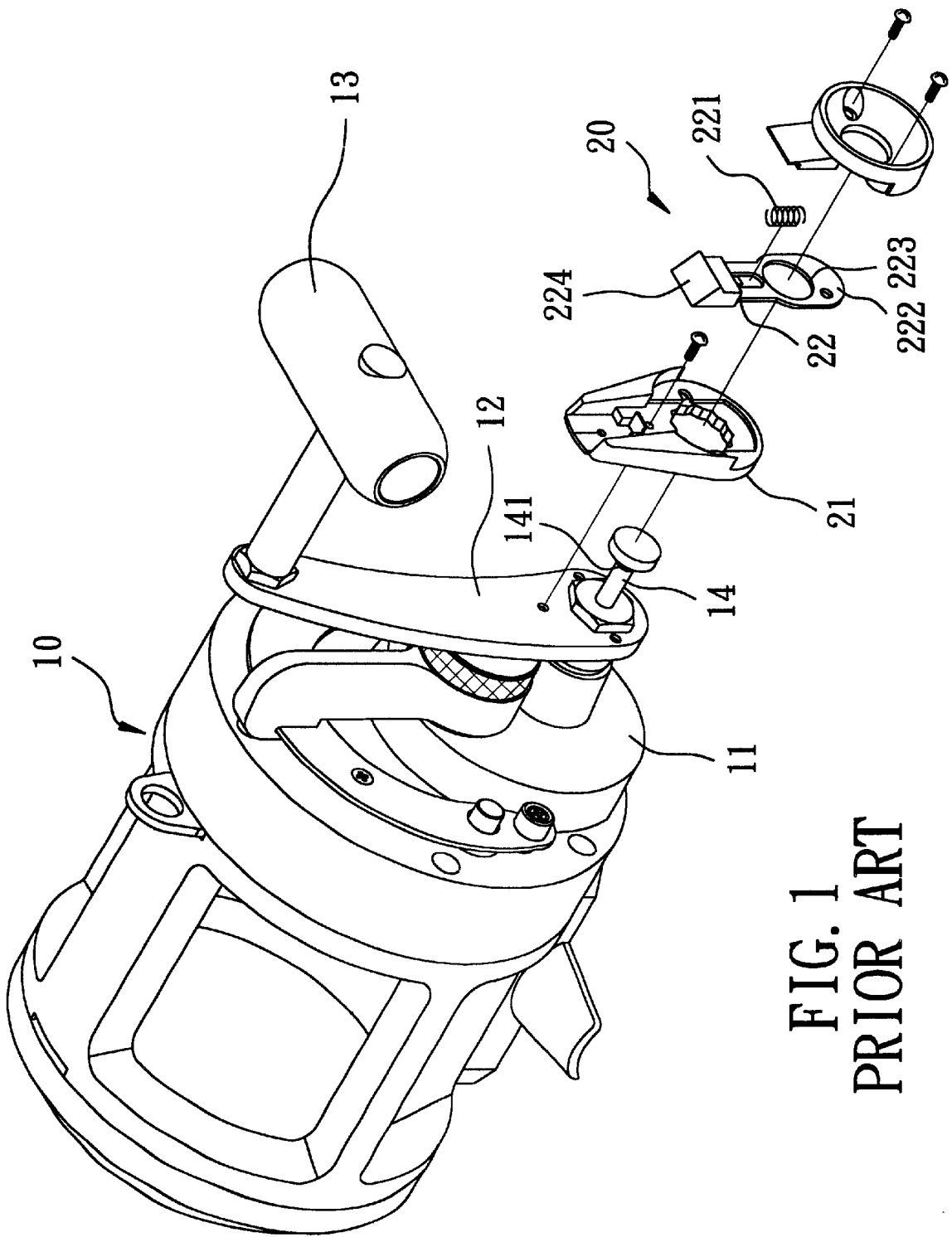
FIG. 1 is a perspective and partly exploded view of a conventional change-speed construction for a fishing reel.
Figure 2A:
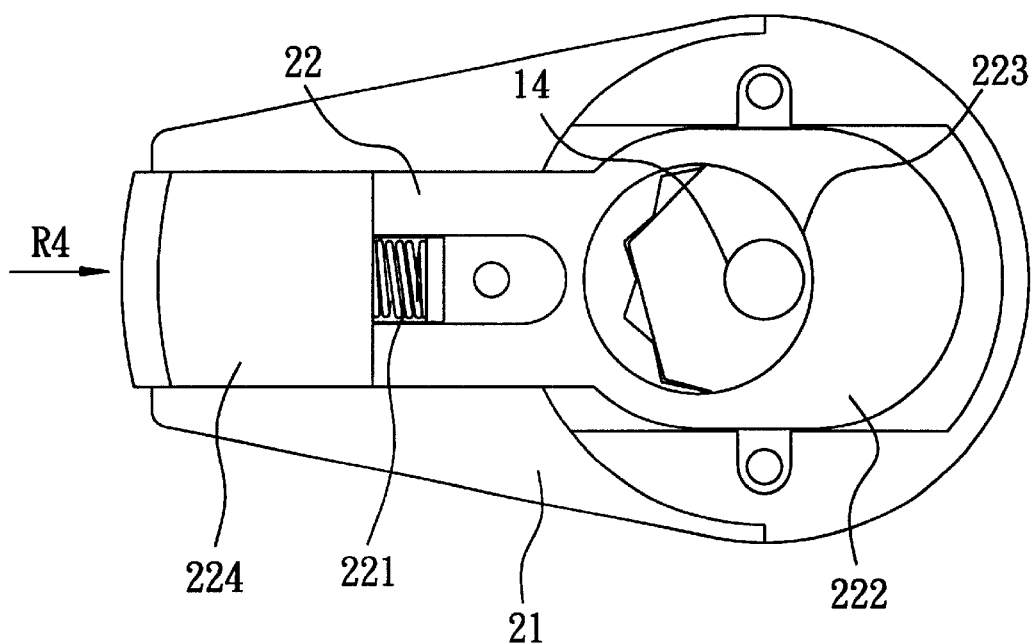
FIGS. 2A and 2B respectively show side and sectional views of the conventional change-speed construction, wherein a control shaft thereof is shown in an extended position.
Figure 2B:
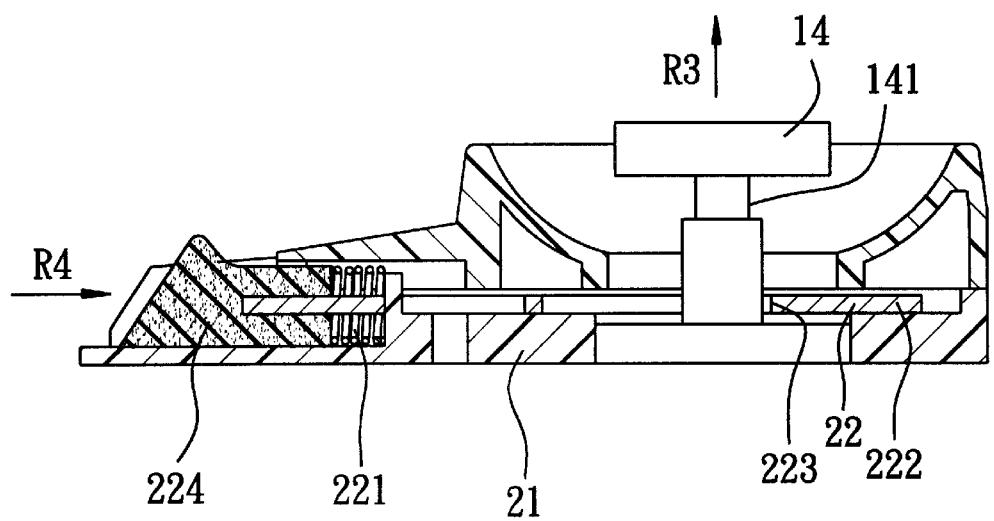
Figure 3A:
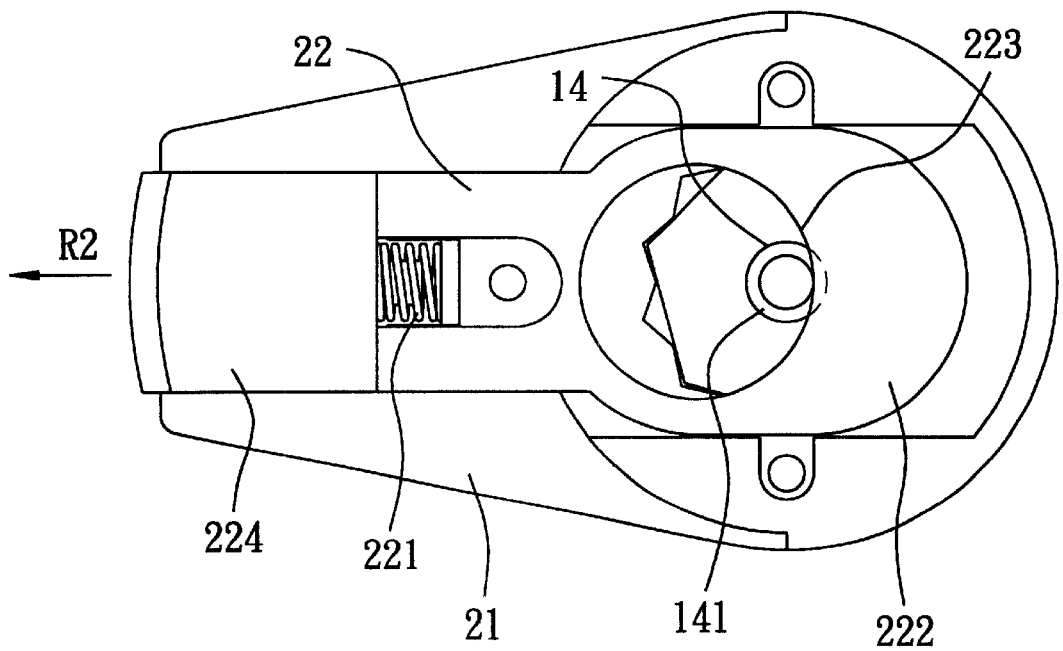
FIGS. 3A and 3B respectively show side and sectional views of the conventional change-speed construction, illustrating the control shaft in a retracted position.
Figure 3B:
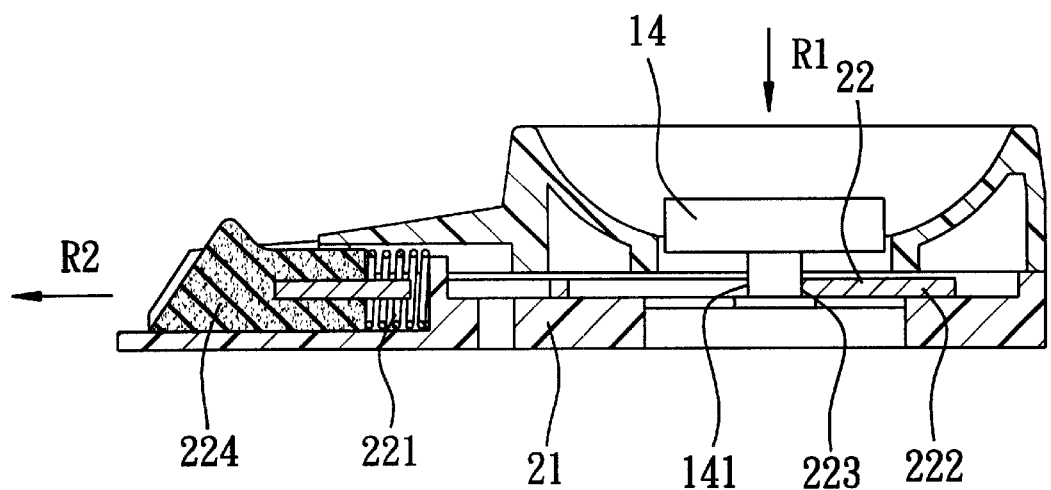
Figure 4:
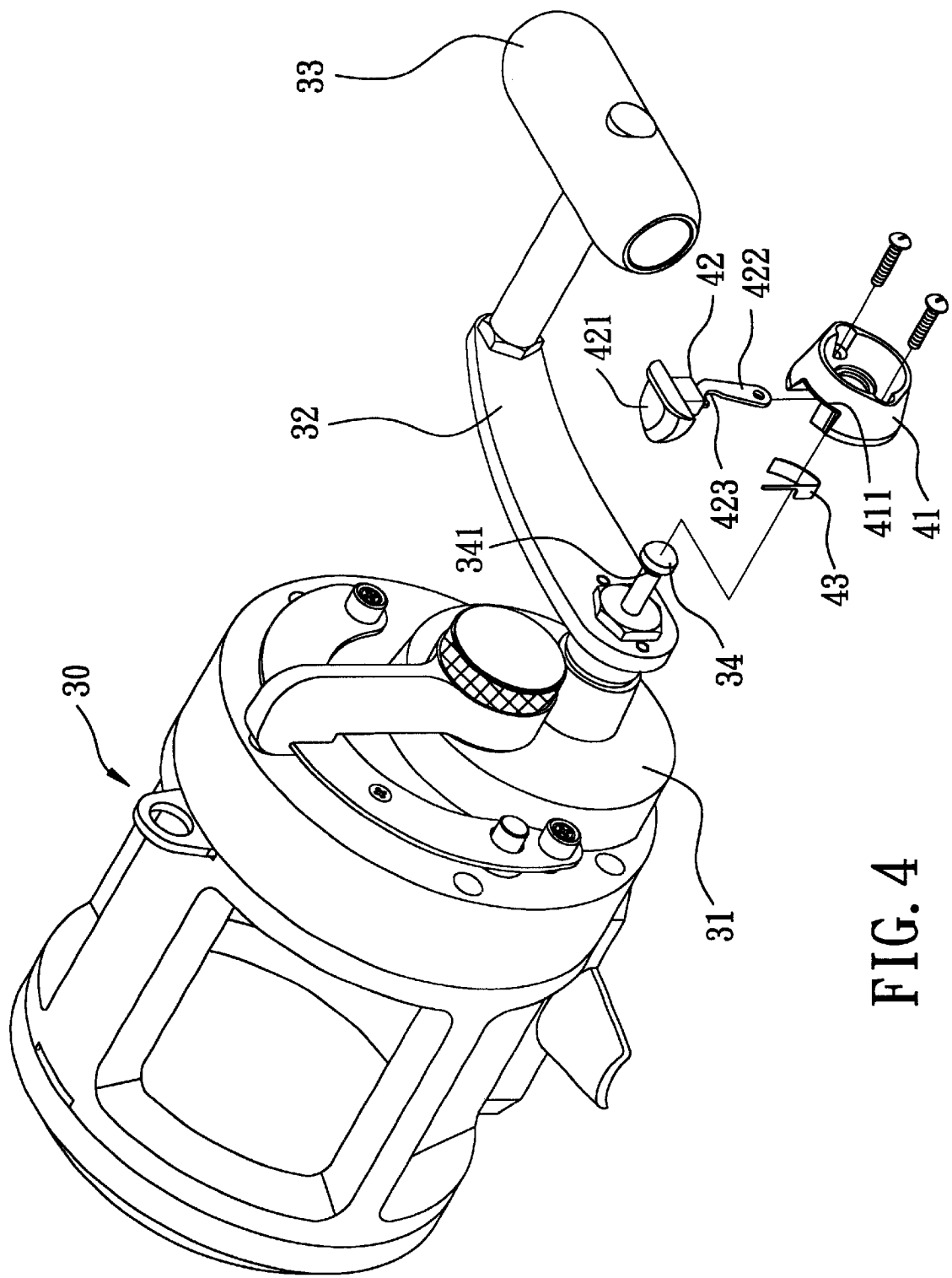
FIG. 4 is a perspective and partly exploded view of a first preferred embodiment of a fishing reel according to the present invention.
Figure 5:
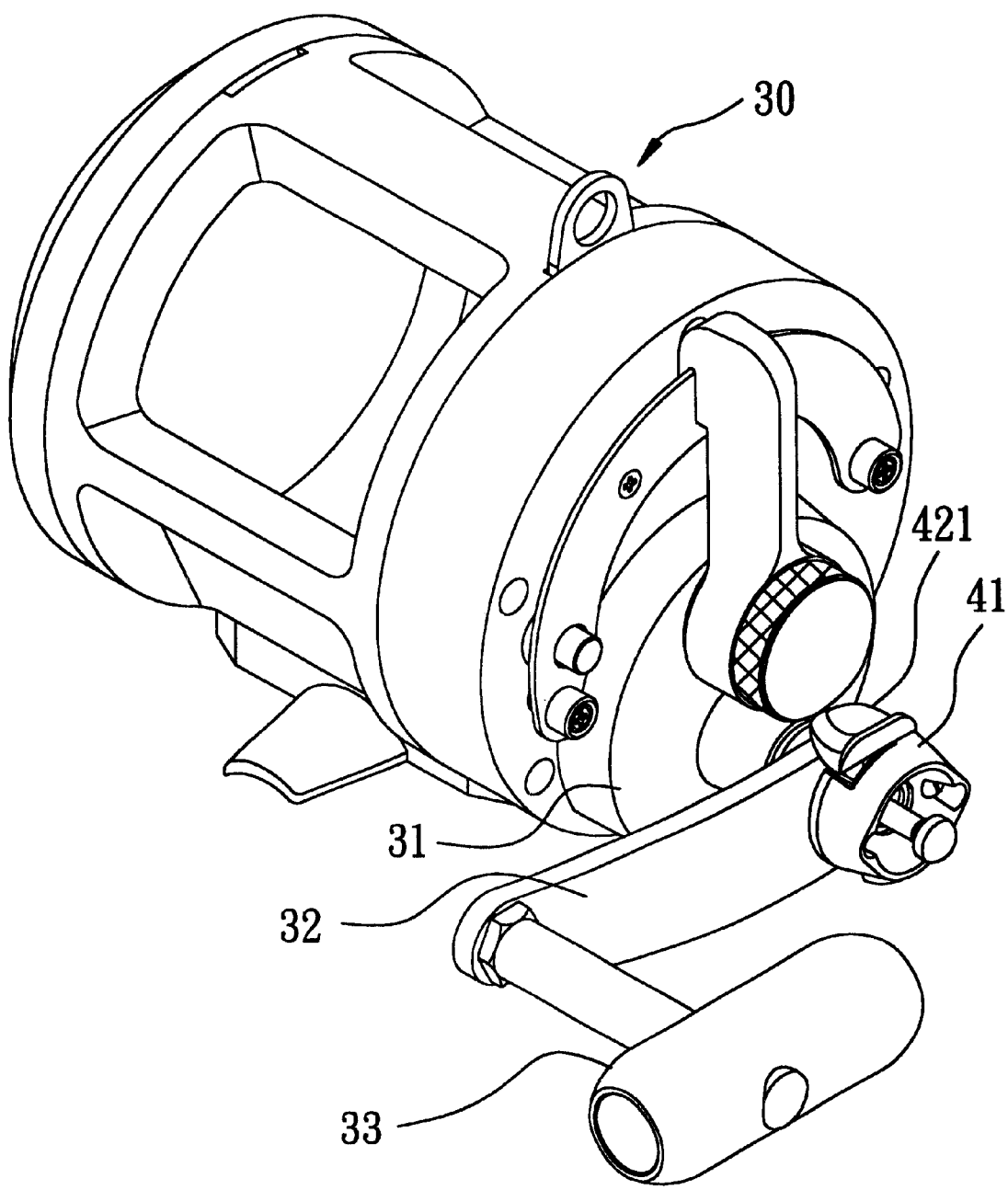
FIG. 5 is a perspective view of the first preferred embodiment.
Figure 6B:
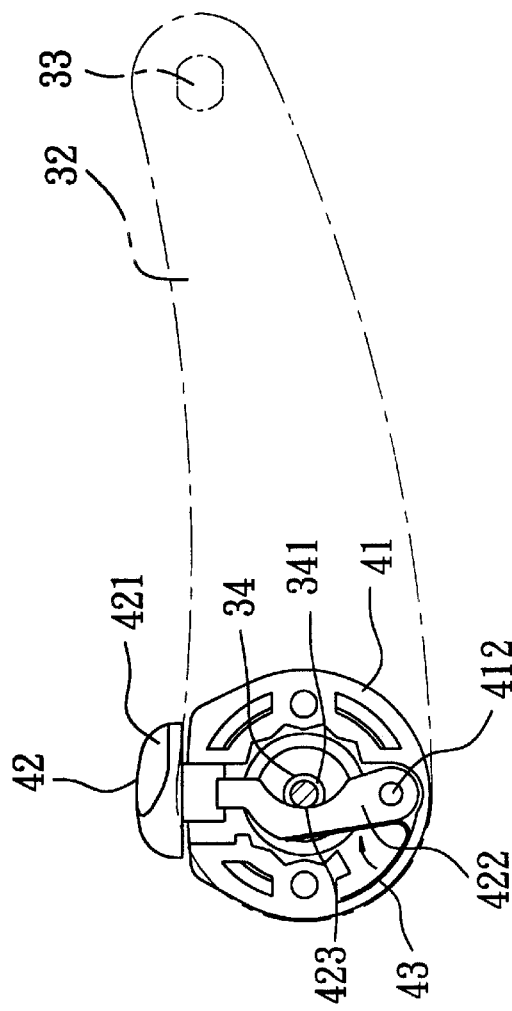
FIGS. 6A and 6B respectively show sectional and side views of the first preferred embodiment, illustrating a control shaft in a retracted position.
Figure 6A:
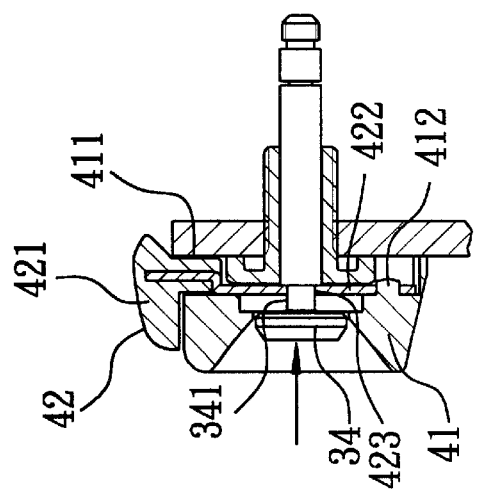
Figure 8B:
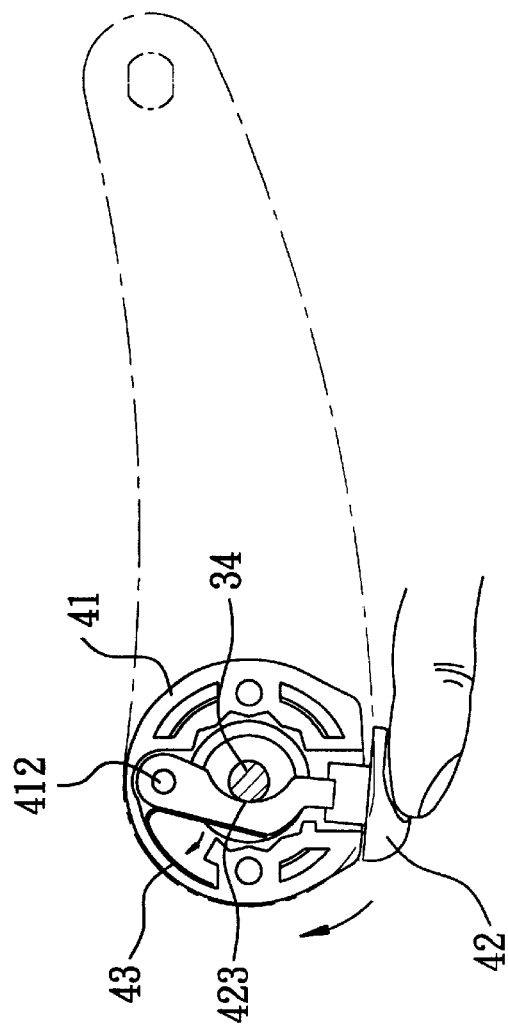
FIGS. 8A and 8B respectively show sectional and side views of a second preferred embodiment, illustrating how the push knob is operated in order to restore the control shaft to the extended position.
Figure 8A:
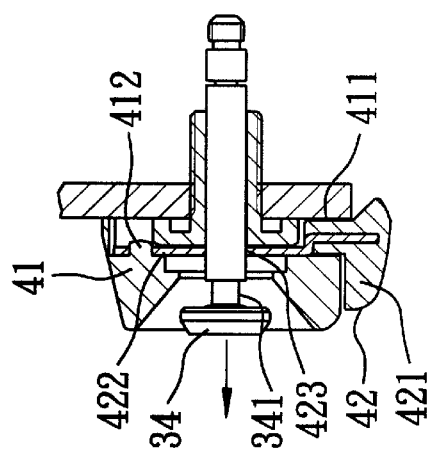

Referring to FIGS. 4 and 5, the first preferred embodiment of a change-speed construction according to the present invention is adapted for use in a fishing reel, and includes a reel body 30, an elongated rotary arm 32, a T-shaped handle unit 33, a tubular hollow housing 41, a spring-biased control shaft 34, a curved spring member 43, a retaining member 42, and a pivot member 412 (see FIGS. 6A and 6B).

As illustrated, the rotary arm 32 has an inner end mounted rotatably on a right side cover plate 31 of the reel body 30. The handle unit 33 is disposed on an outer end of the rotary arm 32.

The housing 41 is fixed on the inner end of the rotary arm 32 by a bolt unit.

The control shaft 34 is mounted axially and movably on the reel body 30, and is connected to a gear device (not visible) disposed within the reel body 30 similar to that disclosed in U.S. Pat. No. 5,058,447. Since the connection of the control shaft 34 to the gear device is not pertinent to the present invention, a detailed description thereof is omitted herein for the sake of brevity. The control shaft 34 is biased to an extended position, as best shown in FIGS. 7A and 7B, where the reel is adapted to be wound at a first speed. The control shaft 34 can be pushed axially and inwardly to a retracted position, where the reel is adapted to be wound at a second speed. The shaft 34 extends through the housing 41, and has an annular groove 341 formed in the distal end thereof.

The spring member 43 is disposed within the housing 41.

The retaining member 42 includes an elongated retaining plate 422 that has an inner end disposed operably in the housing 41 and an outer end, and an operating knob 421 that is connected fixedly to the outer end of the retaining plate 422 in such a manner that the knob 421 is exposed outwardly from the housing 41.

The pivot member 412 is disposed in the housing 41, and is connected rotatably to the inner end of the retaining plate 422 of the retaining member 42 so that the retaining plate 42 serves as a swing arm. Preferably, the pivot member 412 is integrally formed with the housing 41 and extends generally parallel to the control shaft 34 (see FIGS. 6A and 6B). The control shaft 34 is located between the push knob 421 and the pivot member 412, and between the handle unit 33 and the retaining plate 422 of the retaining member 42.

The control shaft 34 can be pushed axially and inwardly to the retracted position relative to the reel body 30, as best shown in FIGS. 6A and 6B, where the retaining plate 422 is biased by the spring member 43 to engage the annular groove 341 in the control shaft 34 so that the latter is retained at the retracted position. The push knob 421 can be actuated against biasing action of the spring member 43 so as to disengage the retaining plate 422 from the annular groove 341 in the control shaft 34. Under this condition, the control shaft 34 is restored to the extended position.

When the control shaft 34 is at the retracted position, pushing of the push knob 421 in the winding direction and away from the handle unit 33 (see FIGS. 7A and 7B) will result in rotation of the retaining plate 422 about the pivot member 412 and consequently results in removal of the retaining plate 422 from the annular groove 341 in the control shaft 34.

In this embodiment, the retaining plate 422 further has a concave portion 423 which engages the annular groove 341 in the control shaft 34.

The housing 41 is preferably formed with a notch 411 to permit extension of the outer end of the retaining plate 422 therethrough.

Referring again to FIGS. 7A and 7B, when the control shaft 34 is located at the retracted position as shown in FIGS. 6A and 6B, the thumb of the user can apply a small pushing force on the push knob 421 for restoring the control shaft 34 to the extended position.

Alternatively, referring to FIGS. 8A, 8B and 9A and 9B, the retaining member 42 may be disposed at an inverted position with respect to the previous embodiment. In this embodiment, the push knob 421 is operated by the index finger of the user.

With this invention thus explained, it is apparent that numerous modifications and variations can be made without departing from the scope and spirit of this invention. It is therefore intended that the invention be limited only as indicated in the appended claims.

I claim:

1. A change-speed construction for a fishing reel, said construction comprising:

a reel body;

a rotary arm having an inner end mounted rotatably on said reel body, and an outer end;

a T-shaped handle unit disposed on said outer end of said rotary arm;

a tubular hollow housing fixed on said inner end of said rotary arm;

a spring-biased control shaft mounted axially and movably on said reel body and biased to an extended position, said control shaft being capable of being pushed axially and inwardly to a retracted position, said control shaft extending through said housing, and having an annular groove formed therein;

a pivot member disposed in said housing and parallel to said control shaft;

a retaining member including an elongated retaining plate having an inner end rotatably connected to said pivot member, and an outer end, and a push knob connected fixedly to said outer end of said retaining plate and exposed outwardly from said housing, said retaining member being disposed relative to said control shaft so that said retaining plate engages said annular groove in said control shaft upon rotation of said retaining member; and a spring member for biasing said retaining member so that said retaining plate engages said annular groove in said control shaft when said control shaft is disposed at the retracted position so as to retain said control shaft at said retracted position, said push knob being capable of being pushed in a direction, when said control shaft is disposed at the retracted position, against biasing action of said spring member so as to disengage said retaining plate from said annular groove such that said control shaft is biased to move from the retracted position to the extended position.

2. The change-speed construction as defined in claim 1, wherein said reel body includes a fixed right side cover plate, on which said rotary arm and said control shaft are disposed.

3. The change-speed construction as defined in claim 1, wherein said retaining plate of said retaining member has a concave portion which engages said annular groove in said control shaft.

4. The change-speed construction as defined in claim 1, wherein said housing is bolted on said rotary arm.

5. The change-speed construction as defined in claim 1, wherein said housing has a notch through which said outer end of said retaining plate of said retaining member extends.

* * * * *